UNITED STATES PATENT OFFICE.

EDWARD HENDERSON, OF NEW YORK, N. Y.

DETERGENT COMPOUND.

SPECIFICATION forming part of Letters Patent No. 259,389, dated June 13, 1882.

Application filed April 20, 1882. (Specimens.)

*To all whom it may concern:*

Be it known that I, EDWARD HENDERSON, of the city, county, and State of New York, have invented a certain new manufacture or composition of matter, which I entitle a "Detergent Compound," to be used for cleansing purposes, and which is fully described and set forth in the following specification, to wit:

I have ascertained by experiment that the different species of the *Yucca* plant, indigenous in portions of the United States and Mexico and elsewhere, contain saponine, sugar, and gum, and that these substances may be obtained from their roots, stalks, and leaves. By drying and separating the woody fiber they appear as a residuum in the form of a powder, which is capable of partial solution in water. This powder I mix with glycerine or any other substance or menstruum which is soluble in water for economical manipulation and use, and to this I add boracic acid or any other preventive to fermentation to prevent its becoming sour, and to retain and increase its saponific and detergent qualities. It may be prepared as a fluid, as a paste, or in solid forms. It may be mixed with any finely-comminuted substances, as powdered charcoal or chalk, and used as a dentifrice, either in the form of wash, paste, powder, or cakes. The saponific and detergent qualities of these preparations are found to be superior to those of soaps manufactured from oils or fats, inasmuch as there is no danger of propagating disease by bacteric germs; dirt is removed rapidly and effectually without causing those chemical reactions which are incidental to the use of soda and potash soaps; there is no discoloration nor injury to fabrics of cotton, flax, silk, or woolen, nor to the texture of the most delicate lace, and there is no rank nor offensive odor. In the dispensary it is found that open sores, ulcers, cuts, flesh wounds, and burns are rapidly ameliorated and closed by the use of these preparations. By their daily use for toilet purposes the skin is rendered soft and fair, and both tan and freckles are removed, and exematous affections speedily yield to its application.

The mode of preparation which I have found to be most convenient is as follows: If the plant is green, I cut it across the fiber into pieces about an inch and a half long to facilitate its drying. When thoroughly dried I crush or tear the pieces, so as to separate the fiber, and collect the contents of the dried cells of the plants, which is the powder I use. The same result may also be obtained by maceration and pressure, or infusion, distillation, and evaporation. I then mix the powder or residuum with glycerine or any like substance in equal proportions of each, and to each pound of this mixture I add four grams of boracic acid, or any other suitable preventive of fermentation. If it is intended as a dentifrice, I also add any of the well-known ingredients of dentifrices.

It is the intention to manufacture this detergent and sell it in packages of convenient size to consumers for use in washing fine woolen, silk, and satin goods, furs, gloves, and laces, as well as for toilet use, and as an article for the dispensary, as it can be kept in any climate in either of the forms of wash, lotion, paste, powder, or cakes without souring or losing its peculiar qualities.

I do not wish to confine myself to the exact process or the exact proportions or ingredients which I have above set forth as most convenient, but do claim the use of substantially the same or equivalent articles if they accomplish the same purpose in substantially the same manner.

What I claim as my invention is—

The manufacture or composition formed of the extract from the cells of *Yucca* plants of saponine, sugar, and gum, together with a suitable menstruum or substance with which it may be incorporated or diffused, together with boracic acid, the whole being a new manufacture or composition, as hereinbefore described.

EDWARD HENDERSON.

Witnesses:
A. S. CUSHMAN,
B. F. MONTGOMERY.